United States Patent [19]

Tanikoshi

[11] 3,999,108
[45] Dec. 21, 1976

[54] SPEED REGULATION SYSTEM FOR DC MOTORS WITH HALL GENERATORS

[75] Inventor: Kinji Tanikoshi, Tokyo, Japan

[73] Assignees: Canon Kabushiki Kaisha; Canon Seiki Kabushiki Kaisha, both of Tokyo, Japan

[22] Filed: July 14, 1975

[21] Appl. No.: 595,419

Related U.S. Application Data

[63] Continuation of Ser. No. 388,953, Aug. 16, 1973, abandoned.

[52] U.S. Cl. .............................. 318/138; 318/254
[51] Int. Cl.² ........................................ H02K 29/00
[58] Field of Search .......................... 318/254, 138

[56] References Cited
UNITED STATES PATENTS

| | | | |
|---|---|---|---|
| 3,584,280 | 6/1971 | Inagaki | 318/138 |
| 3,743,902 | 7/1973 | Perkins | 318/138 |
| 3,743,906 | 7/1973 | Torok | 318/254 |
| 3,754,175 | 8/1973 | Girault | 318/138 |
| 3,775,648 | 11/1973 | Brown | 318/254 |

Primary Examiner—B. Dobeck
Attorney, Agent, or Firm—Fitzpatrick, Cella, Harper & Scinto

[57] ABSTRACT

A speed regulation system for DC motors of the type comprising a rotor having magnetic poles of opposite polarities, a stator having at least one pair of flux-producing windings positioned in torque producing relation with the rotor, and Hall generators positioned in fixed relation to the stator and angularly spaced apart from each other in magnetic relation to the rotor so as to sense the magnitude of the rotor flux density as a function of the angular position of the rotor. The speed regulation system comprises a circuit for detecting the frequency of the output signals of the Hall generators so as to generate the pulse signals representing the peak values of the output signals, a phase shifter for shifting the phase of the pulse signals, and a wave shaping circuit for generating the signals with a desired waveform in response to the output signal of the phase shifter. In response to the output signals of the wave shaping circuit a drive circuit for supplying the driving current to the stator windings is controlled, whereby the DC motor may be rotated at a constant speed.

5 Claims, 11 Drawing Figures

SPEED REGULATION SYSTEM FOR DC MOTORS WITH HALL GENERATORS

This is a continuation of application Ser. No. 388,953, filed Apr. 16, 1973 now abandoned.

BACKGROUND OF THE INVENTION

1. Field of the Invention

The present invention relates to generally a speed regulation system for brushless DC motors and more particularly a speed regulation system for DC motors with Hall generators of the type in which the supply of the driving current to the stator windings is switched in response to the angular position of the rotor made of permanent magnet which is detected by the Hall generators, the speed regulation system comprising means for detecting the frequency of the alternating output voltages of the Hall generators representing the rotational speed of the rotor so as to generate the pulse signals representing the frequency of the alternating output signals, and an oscillator which is triggered in response to the pulse signals from the detecting means so that the output signals with a desired waveform may be applied through switching means and a driving circuit to the stator windings of the DC motor.

2. Description of the Prior Art

There has been known a DC motor with Hall generators of the type in which in response to the output Hall voltages of Hall generators which are so disposed as to detect the angular position of a rotor a transistorized driving circuit supplies the driving current to stator windings. The waveform of the driving current is in general sinusoidal, but other waveforms may be used, and the phase of the driving current is dependent upon the positions of the Hall generators on the stator. Since the phase of the driving current relative to the stator windings is determined in the assembly step, the torque with the maximum efficiency cannot be obtained. Furthermore it is extremely difficult to form a waveform of the driving current so as to obtain the maximum torque.

SUMMARY OF THE INVENTION

In view of the above, one of the objects of the present invention is to provide a speed regulation system for DC motors with Hall generators of the type in which the supply of the driving current to stator windings is switched in response to the angular position of a rotor made of permanent magnet which is detected by the Hall generators, the speed regulation system comprising means for detecting the frequency of the alternating output voltages of the Hall generators representing the rotational speed of the rotor so as to generate the pulse signals representing the frequency thereof, and an oscillator which is triggered in response to the output pulse signals of the detecting means so that the output signals of desired waveform may be applied through switching means and a driving circuit to the stator windings of the DC motor, whereby the DC motor may be rotated at a constant speed.

A further object of the present invention is to provide a speed regulation system for DC motors of the type described in which a phase shifter is inserted so that the output pulses of the detecting means are shifted in phase prior to being applied to the oscillator so that the driving current completely in phase with the stator windings may be supplied, whereby the maximum and uniform torque may be produced.

A further object of the present invention is to provide a DC motor with Hall generators of the type synchronized with an oscillator. After the DC motor has been started, it is rotated in synchronism with the output signals of the oscillator or waveform generator independently of the output signals of the Hall generators so that the DC motor may be rotated at a constant speed.

A further object of the present invention is to provide a speed regulation system for DC motors with Hall generators of the type in which after the DC motor has been started, the driving current is supplied to the stator windings in response to the output signals of an oscillator or wave shaping circuit independently of the output signals of the Hall generators and the voltages induced across the stator windings which are not supplied with the driving current are detected so that the DC motor may e rotated at a constant speed.

The above and other objects, features and advantages of the present invention will become more clear from the following description of preferred embodiments thereof taken in conjunction with the accompanying drawing.

BRIEF DESCRIPTION OF THE DRAWING

Similar parts are designated by similar reference numerals throughout the figures.

DESCRIPTION OF THE PREFERRED EMBODIMENTS

Figure 1:
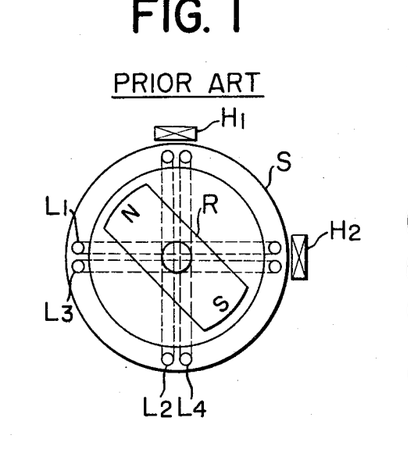
FIG. 1 is a sectional view of a conventional brushless DC motor with Hall generators to which is applied a speed regulation system of the present invention.

A conventional DC motor which is shown FIG. 1 and to which is applied the speed regulation system of the present invention has a rotor R having magnetic poles of opposite polaries and a stator S having at least a pair of flux-producing windings $L_1$–$L_4$ positioned in torque producing relation with the rotor R. Hall generators $H_1$ and $H_2$ are positioned in fixed relation to the stator S and angularly spaced apart from each other and in magnetic relation to the rotor R so as to sense the magnitude of the rotor flux density as a function of the angular position of the rotor R. Direct current flows through the Hall generators $H_1$ and $H_2$ so that the Hall voltage is induced across each of the Hall generators $H_1$ and $H_2$ as a function of the angular position of the rotor R.

Figure 2:
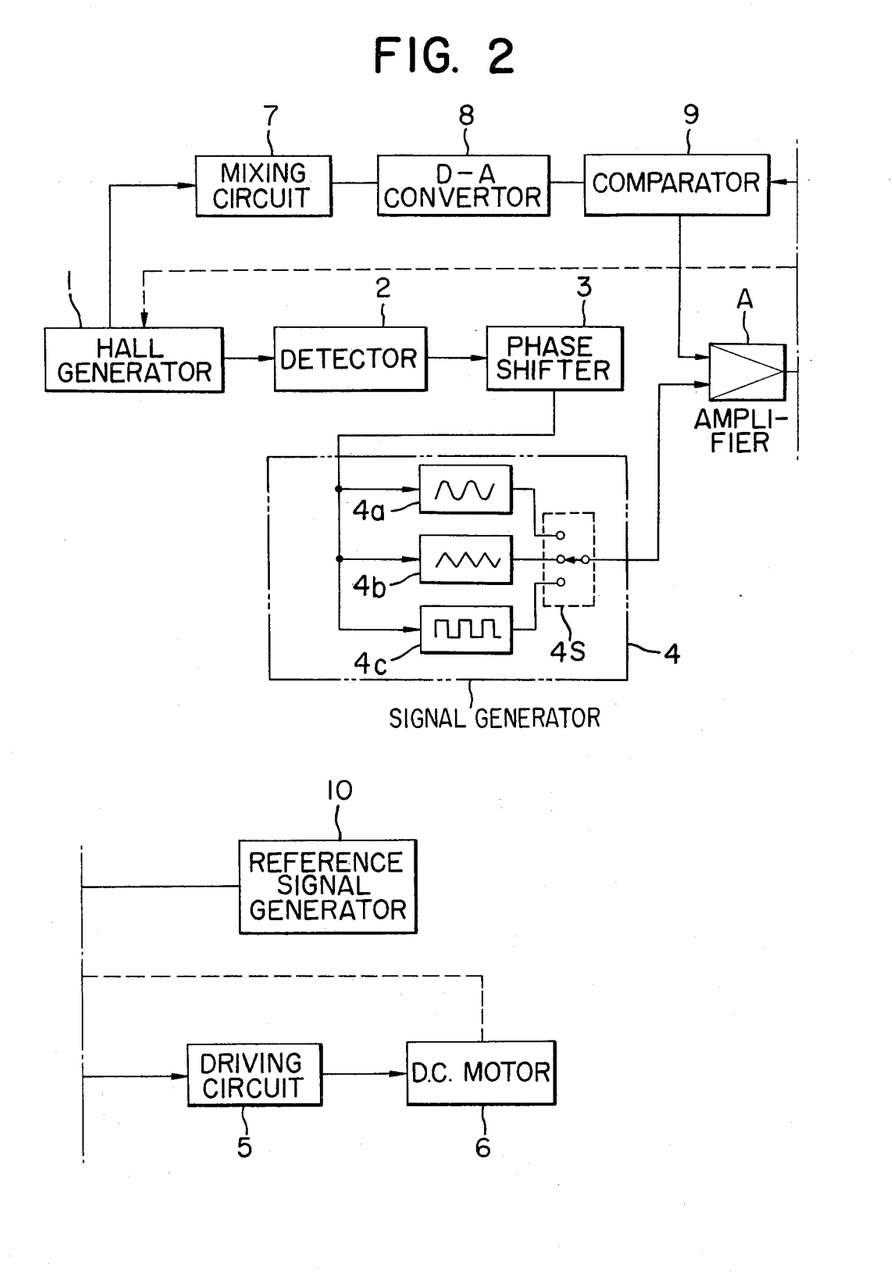
FIG. 2 is a block diagram of a first embodiment of a speed regulation system in accordance with the present invention.

Next referring to FIG. 2 illustrating the block diagram of the first embodiment of a speed regulation system for the DC motor of the type described above with reference to FIG. 1 in accordance with the present invention, the DC motor is denoted by 6 whereas the Hall generator $H_1$ and $H_2$, by 1. The hall voltages are detected by a detector 2 so that the pulse signals representing the peak values of the Hall voltage are applied to a phase shifter 3 coupled to a signal generator 4 comprising three waveform generators 4a, 4b and 4c shaping the sinusodial, sawtooth and rectangular waveforms. The phase of the peak values of the Hall voltage is suitably shifted by the phase shifter 3 and applied to the signal generator 4. The output signal of the signal generator 4 is selected by switching means S and applied to a logic-amplifier circuit A whose output terminal is adapted to perform logic functions. the output of the logic-amplifier A is applied to a driving circuit 5 connected to the stator windings of the DC motor 6.

The Hall generators 1 are also connected to a mixing circuit 7 coupled to a DA converter 8 which in turn is coupled to an analog comparator 9. A reference signal generator 10 is also coupled to the comparator 9 to apply to it a reference signal representing a predetermined speed of the DC motor 6, and the output of the comparator 9 is coupled to the amplifier A.

Next the mode of operation for selecting a desired torque distribution will be described hereinafter. The Hall voltage produced by the Hall generator is an alternating signal whose frequency is in proportion to the rotational speed of the rotor of the DC motor 6. In response to the Hall voltage the detector 2 generates the pulse signal representing the peak value of the Hall voltage, and the pulse signal is shifted in phase by the phase shifter 3 to be applied as a trigger signal to the signal generator 4. The phase shifter 3 will be described in more detail hereinafter. The waveforms generated by the signal generator 4 are in phase with the Hall voltage, that is in synchronism with the rotational speed of the DC motor 6. One of the three waveforms is selected by the switching means 4S and applied to the amplifier A as one input thereof. The output signal of the signal generator 4 is amplified by the amplifier A and applied to the driving circuit 5 so that the driving currents are supplied to the stator windings of the DC motor 6.

In order to maintain the predetermined speed of the DC motor 6, the amplification degree of gain of the amplifier 5 is controlled in response to the output signal of the comparator 9. Two output signals of the Hall generators are mixed by the mixing circuit 7 so that the frequency of the output signal thereof correctly represents the rotational speed of the DC motor 6. The frequency is counted in a digital manner by a counter and the digital signal representing the frequency is converted into the DC analog signal by the DA convertor 8 to be applied to the comparator 9. The DC analog signal representing the instantaneous rotational speed of the DC motor is compared with the reference signal by the comparator 9 so that the signal representing the difference between the two signals is applied to the amplifier A. That is, the level output signal of the comparator 9 represents the difference between the two signals, and in response to the output signal of the comparator 9 the gain of the amplifier A is controlled.

Therefore the driving current with a desired waveform may be derived by selecting one of the three waveforms generated by the signal generator 4 and applied to the stator windings of the DC motor whereby a desired torque distribution may be obtained.

Figure 3A:
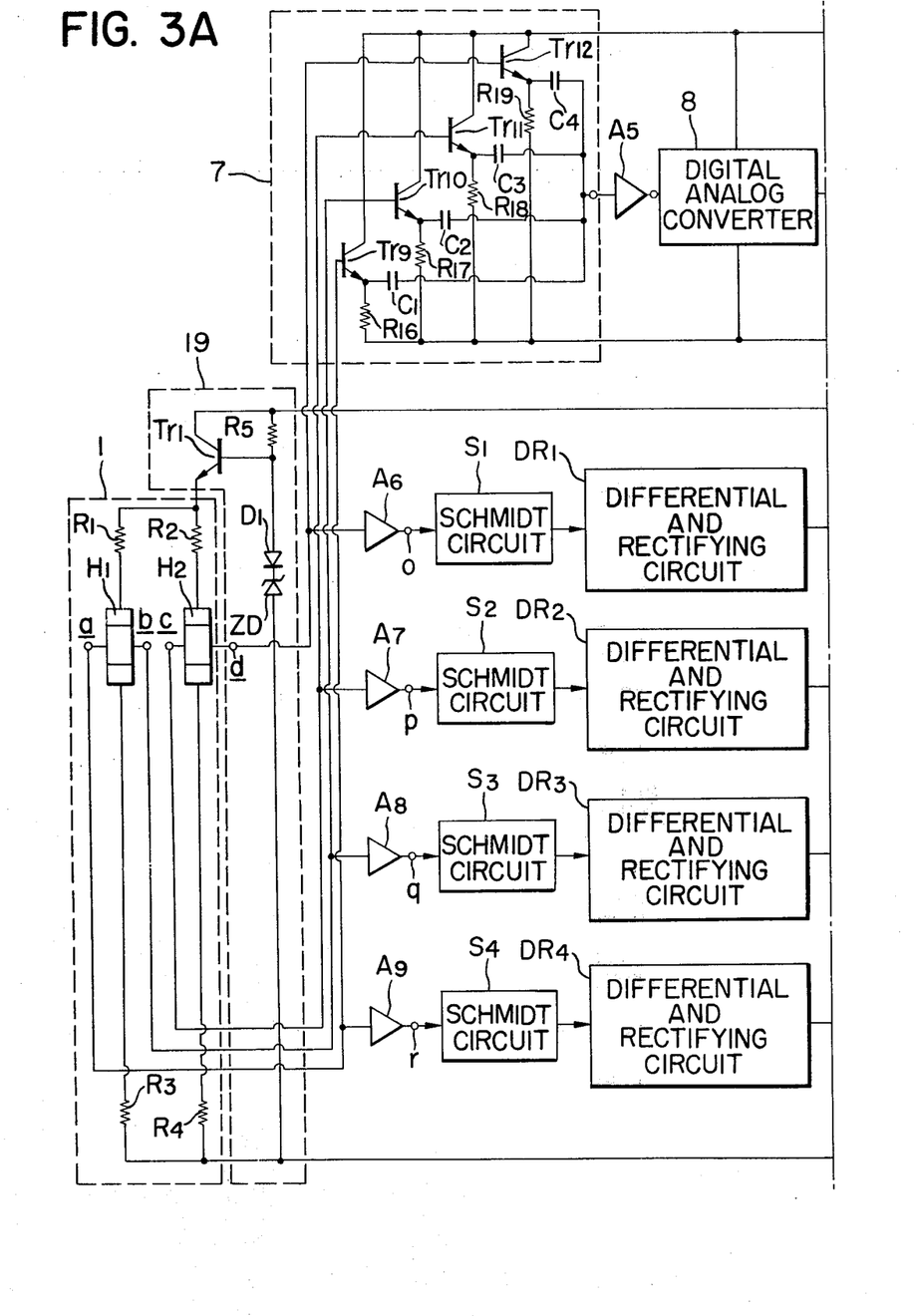
FIGS. 3A and 3B are a detailed circuit diagram thereof.
Figure 3B:
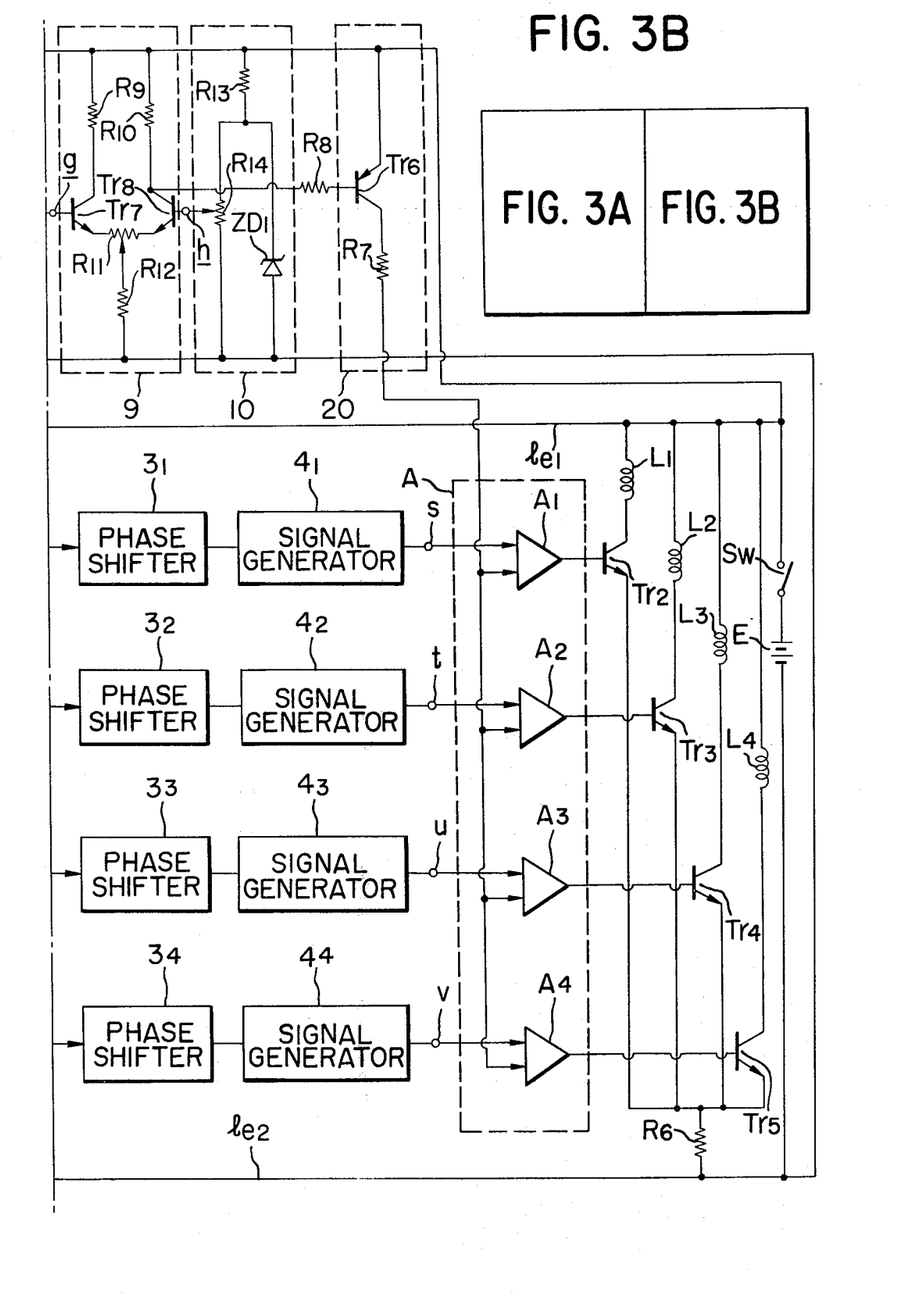

Next referring to FIG. 3 the first embodiment will be described in more detail hereinafter. The Hall generators $H_1$ and $H_2$ are connected to input current limiting resistors $R_1$ and $R_2$ and biase resistors $R_3$ and $R_4$, respectively. The emitter of a power amplifying transistor $Tr_1$ is connected to the junction of the resistors $R_1$ and $R_2$ whereas the collector is connected to the positive terminal of a power source E through a lead line $l_{e1}$ and a main or on-off switch Sw. The base of the transistor $Tr_1$ is connected through the resistor $R_5$ to the lead wire $l_{e1}$. The resistor $R_5$ is connected to a diode $D_1$ which in turn is connected in series to a zener diode ZD connected to a lead wire $+e2$ coupled to the negative terminal of the power source E. The transistor $Tr_1$, the resistor $R_5$, the diode $D_1$ and the zener diode ZD constitute a voltage regulator 19.

The outputs of the Hall generator $H_1$ and $H_2$ are connected to DC amplifiers $A_6$–$A_9$, respectively, whose outputs are connected to Schmidt circuits $S_1$–$S_4$, respectively, which constitute the detector 2 in FIG. 2. The outputs of the Schmidt circuits $S_1$–$S_4$ are connected to differentiating and rectifier circuits $DR_1$–$DR_4$, respectively, whose outputs are coupled to waveform generators $4_1$–$4_4$ through phase shifters $3_1$–$3_4$, respectively. The outputs of the signal generators waveform generators $4_1$–$4_4$ are coupled to one input terminals of amplifier $A_1$–$A_4$, respectively, whose output terminals are adapted to perform logic functions. The outputs of the amplifiers $A_1$–$A_4$ are coupled to the bases of transistors $Tr_2$–$Tr_5$, respectively, of the driving circuit.

The output terminals a,b,c, and d of the Hall generators $H_1$ and $H_2$ are also connected to the bases of coupling transistors $Tr_{12}$–$Tr_{16}$ of the mixing circuit 7 shown in FIG. 2. The mixing circuit 7 further comprises transistors $Tr_{12}$–$Tr_{16}$, emitter-follower resistors $R_{16}$–$R_{19}$ and coupling capacitors $C_1$–$C_4$, and the output terminal is connected to the digital-analog converter 8 whose output is connected to the input terminal g of the comparator 9.

The comparator 9 comprises amplifying transistors $Tr_7$ and $Tr_8$, load resistors $R_9$ and $R_{10}$, a variable resistor $R_{11}$ for balancing the transistor $Tr_7$ and $Tr_8$, and an amitter resister $R_{12}$. The input terminal h is connected to the reference signal generator 7 comprising zener diode $ZD_1$ a biase resistor $R_{13}$, and a balancing resistor $R_{14}$.

The output of the comparator 9 is connected through a coupling resistor $R_8$ to a coupling amplifier 20 comprising a switching or amplifying transistor $Tr_6$ and a load resistor $R_7$. The output of the coupling amplifier 20 is connected to the other input terminals of the amplifier $A_1$–$A_4$.

Figure 4:
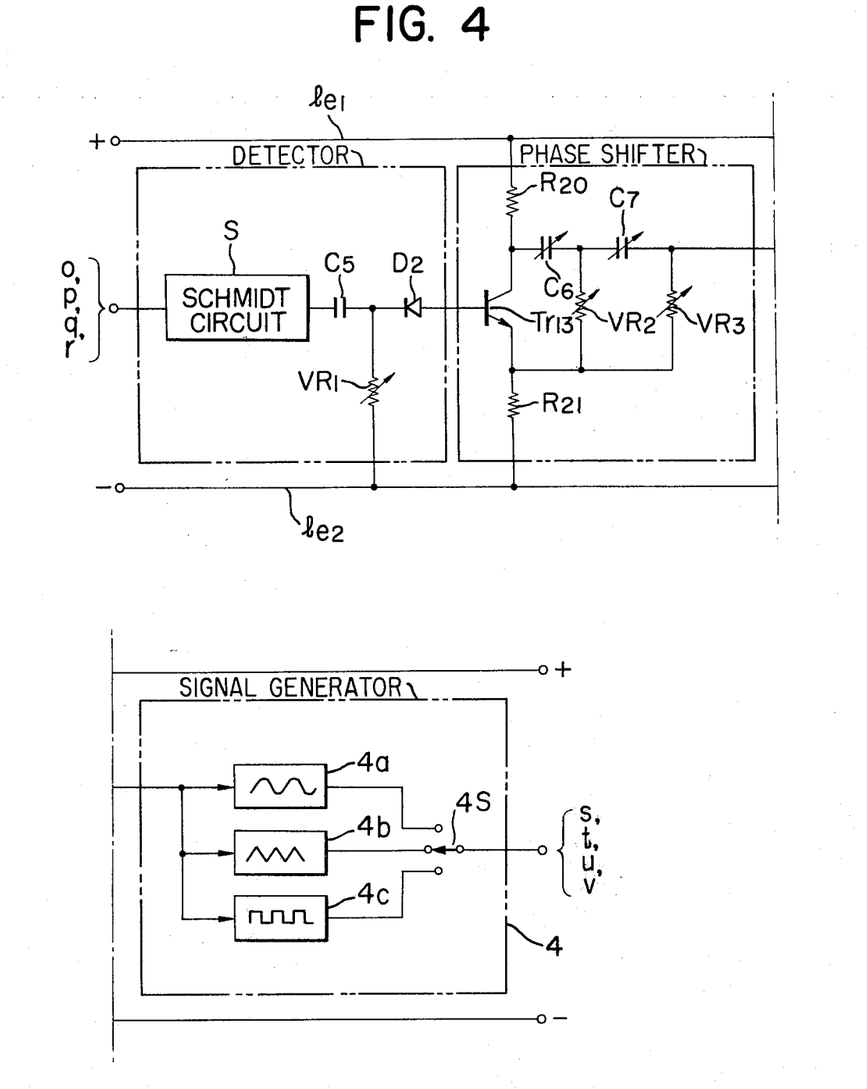
FIG. 4 is a detailed circuit diagram of a detector, a phase shifter and a signal generator or waveform shaping circuit shown in FIGS. 2 and 3.

Next referring to FIG. 4 the detector 2, the phase shifter 3 and the signal generator 4 will be described in more detail hereinafter. The block shown in FIG. 4 is connected to the input terminals o,p,q, and r and the ouput terminals s,t,u and v shown in FIG. 3. In other words four similar circuits shown in FIG. 4 are interconnected between the input and output terminals o and s;p and t;q and u; and r and v.

The output of a Schmidt circuit S is coupled a differentiating circuit comprising a capacitor $C_5$ and a variable resistor $VR_1$, and the output of the differentiating circuit is coupled to the rectifying diode $D_2$ for detecting the frequency of the Hall voltage and generating the trigger pulses. The output of the diode $D_2$ is coupled to the base of a transistor $Tr_{13}$ whose collector is coupled through a resistor $R_{20}$ to the lead wire $l_{e1}$ and whose emitter, to the lead wire $l_{e2}$ through an emitter resistor $R_{21}$. The phase shifter comprises the transistor $Tr_{13}$, variable resistors $VR_2$ and $VR_3$ and variable capacitors or varactors $C_6$ and $C_7$. These variable resistors $VR_2$ and $VR_3$ and the varactors $C_6$ and $C_7$ are used to adjust the phase shift. The output of the phase shifter is coupled to the signal generator 4 which in turn is coupled to the input terminal of the amplifier $A_1$, $A_2$, $A_3$ or $A_4$ shown in FIG. 3.

Next referring back to FIGS. 3 and 4 the mode of operation of the first embodiment will be described in more detail. The main or on-off switch Sw is closed so that a constant current flows through the transistor $Tr_1$ into the Hall generators $H_1$ and $H_2$. The waveform of the Hall voltage produced by the Hall generator $H_1$ or $H_2$ is similar to a sinusoidal waveform because the rotor of the DC motor is rotating. The Hall voltages are supplied to the amplifiers $A_6$–$A_9$ and to the mixing circuit 7.

Four output signals from the Hall generators $H_1$ and $H_2$ which are out of phase are mixed so that thz signal representing the synthesized Hall voltages is applied to the amplifier $A_5$. That is, each transistor $Tr_9$ – $Tr_{12}$ of the mixing circuit 7 is sequentially controlled by the Hall voltage from the Hall generators $H_1$ and $H_2$ so that the mixing circuit outputs a pulse corresponding to the various pulses shown in FIG. 5($a$) – ($d$), superposed. In other words, the mixing circuit 7, or amplifier $A_5$, outputs the above-mentioned pulse as an output signal corresponding to the motor-speed. The amplified signal is applied to the digital-analog converter 8 so as to be converted into the DC analog signal whose level represents the frequency of the synthesized signal. The DC analog signal is applied to one input terminal $g$ of the comparator and compared with the reference signal supplied thereto from the reference signal generator 10 so that the signal representing the difference in level between two signals is generated and applied to the transistor $Tr_6$ through the resistor $R_8$. Since the comparator 9 is constructed with an analog type of differential amplifier, the digital-analog converter 8 is necessary to convert the digital output signal from the mixing circuit 7 to an analog signal. When the rotational speed of the DC motor 6 is lower than a predetermined speed, that is when the potential at the input terminal $g$ is lower than that at the input terminal $h$, the transistor $Tr_8$ conducts more than the transistor $Tr_7$ so that the collector potential of the transistor $Tr_8$ is lower than that of the transistor $Tr_7$. As a result the base potential of the transistor $Tr_6$ is lowered so that the transistor $Tr_6$ is conducted. The output signal of the coupling circuit or transistor $Tr_6$ is applied to the one input terminals of the amplifiers $A_1$–$A_4$.

The output signals or Hall voltages of the Hall generators $H_1$ and $H_2$ are applied through the amplifiers $A_6$–$A_9$ to the Schmidt circuits $S_1$–$S_4$, and the output signals of the Schmidt circuits $S_1$–$S_4$ are differentiated by the differentiating circuits to be converted into the positive or negative pulse signal. The rectifier $D_2$ passes only the positive pulse signal to the base of the transistor $Tr_{13}$ of the phase shifter. The positive pulse signals shown in FIG. 5(B) represent the crest values of the synthesized Hall voltage shown in FIG. 5(A).

Figure 6:
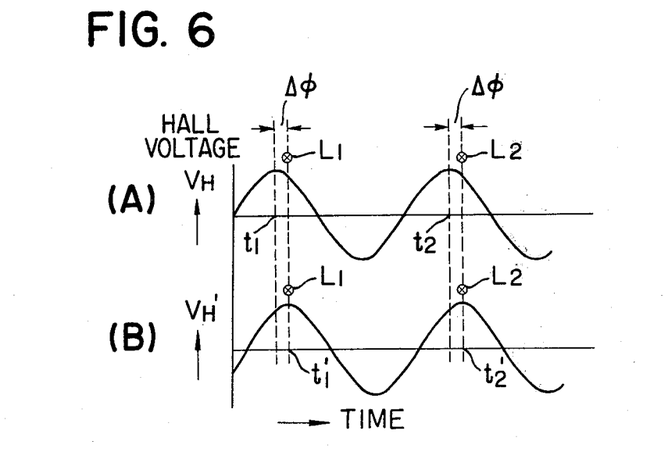

Next referring to FIG. 6 the mode of operation of the phase shifter 3 will be described in more detail. The waveform and phase of the synthesized Hall voltage output signal is shown in FIG. 6(A), and the crest values are assumed to appear at $t_1$ and $t_2$ whereas the phase positions of the stator windings $L_1$ and $L_2$, to be at $t_{1'}$ and $t_{2'}$. Then there is a difference in phase $\Delta\phi$ between the crest value and the stator winding so that the maximum torque is not produced by the DC motor. In order to solve this problem and according to the present invention, the phase of the Hall voltage is shifted by the phase shifter 3 so that the phase of the Hall voltage may exactly coincide with that of the stator windings of the DC motor as shown in FIG. 6(B) to produce the maximum torque. Therefore the phase difference caused by the product variation may be compensated by the external phase shifters $3_1$–$3_4$ so that the maximum efficiency may be achieved in a simple manner in operation. Furthermore a desired torque distribution may be attained by adjusting the phase shifters.

Figure 5:
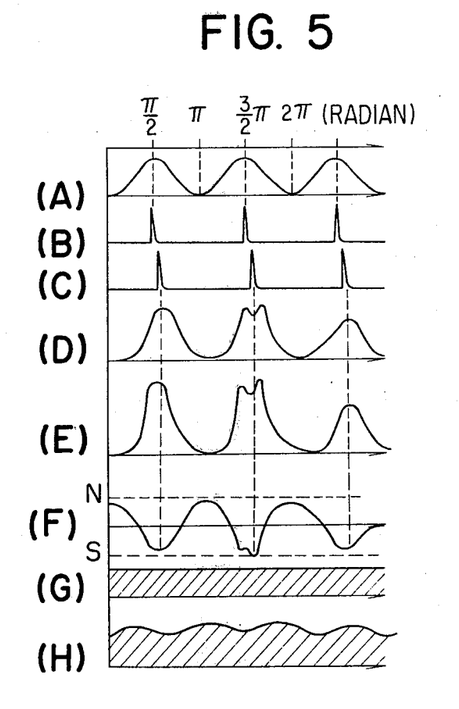
FIGS. 5A through 5H and FIGS. 6A and 6B are views used for the explanation of the mode of operation of the first embodiment.

The pulse train whose phase is shifted from that shown in FIG. 5 to coincide with that of the stator windings is shown in FIG. 5(C). The pulse train are applied to the waveform generator 4$a$, 4$b$ or 4$c$ in the signal generator as the trigger pulses.

When the magnetic flux distribution of the field system was in the condition as shown in FIG. 5 (m), due to a lack of uniformity of the magnetization condition of the rotor R, conventionally, it was difficult to obtain a uniform torque. The foregoing problem is solved in accordance with the present invention wherein, to the stator windings coils $L_1$ – $L_4$, a driving current is supplied, which is symmetrical with that shown in FIG. 5($m$). This method will be discussed in detail hereinafter in conjunction with FIGS. 1, 3 and 5 of the drawings.

It is now assumed that the measurement of the magnetic distribution in motor 1 exhibits the magnetization condition as shown in FIG. 5($m$). In this case, a switch (not shown) in the signal generator $4_1$ is connected to the sinusoidal waveform signal generating circuit in the signal generator $4_1$, and a switch (not shown) in the signal generator $4_2$ is connected to the generating circuit in the signal generator $4_2$, which generates sequentially the waveform signal as shown in FIG. 5($j$), and a switch (not shown) in the signal generator $4_3$ and a switch (not shown) in the signal generator $4_4$ are connected to the sinusoidal waveform signal generating circuits, respectively. When the rotor R in the motor passes through the position 0 (radian) shown in FIG. 1, there is established a Hall voltage at the output terminal $a$ of the Hall element $H_1$ due to the magnetic flux of rotor R. Such Hall voltage begins to gradually increase according to the rotational movement of the rotor R, as shown in FIG. 5(a). When the rotor R rotates to the position of $\pi/4$ (radians), and the Hall voltage at the output terminal $a$ reaches E $\pi/4$ volts, Schmidt circuit S, is inverted from the initial state thereof, so that a differential pulse (as shown in FIG. 5(e)) is derived from the differential and rectifying circuit $DR_4$. The differential pulse triggers signal generator $4_4$, which in turn begins to oscillate so as to derive a sinusoidal waveform signal, as shown in FIG. 5($i$), from the output thereof. This causes transistor $Tr_5$ to be conductive, so that the driving current corresponding to the base current of transistor $Tr_5$, that is, the output current of signal generator $4_4$, may flow through the stator winding coil $L_4$, whereby rotor R is attracted in the direction of the Hall element $H_1$. As a result, rotor R continues to be rotated in the clockwise direction, and this increases the Hall voltage at the output terminal $a$ of the Hall element $H_1$. Upon rotor R reaching the position of $\pi/2$ (radians), the Hall voltage at the output terminal $a$ of the Hall element $H_1$ reaches its highest value. After rotor R passes through the position of $\pi/2$ (radians), the Hall voltage at the output terminal a begins to gradually decrease. On the contrary, at the output terminal c of the Hall element $H_2$ there is established a Hall voltage (shown in FIG. 5(c)) which begins to gradually rise in response to the rotation of rotor R. In this case, upon rotor R rotating to the position of $\pi/4$ (radians), and the Hall voltage at the output terminal c of the Hall element $H_2$ reaching E ($\pi/4$) volts, the Schmidt circuit $S_2$ is inverted from the initial state thereof, so that a differential pulse (as shown in FIG. 5(f) is derived from the differential and rectifying circuit $DR_2$. The differential pulse triggers signal generator $4_2$, which, in turn, begins to oscillate so as to derive a waveform signal as shown in FIG. 5(f) from the output thereof. Further the differential pulse from the differential and rectifying circuit $DR_2$ is applied to the signal generator $4_4$ through an adapted circuit (not shown). This causes the signal generator $4_4$ to stop the oscillation thereof. Therefore, after rotor R passes through the position $3\pi/4$ (radians), the driving current corresponding to the output signal (FIG. 5(j) from the signal generator $4_2$ flows through only the stator winding coil $L_2$, whereby rotor R is attracted in the clockwise direction and continues to be rotated in the clockwise direction. Upon rotor R rotating to the position of $5\pi/4$ (radians), the Schmidt circuit $S_3$ is inverted from the initial state thereof due to the Hall voltage at the output terminal b of the Hall element $H_1$, so that a differential pulse, as shown in FIG. 5(g), is derived from the differential and rectifying circuit $DR_3$. This differential pulse triggers signal generator $4_3$ which, in turn, begins to oscillate so as to derive a sinusoidal waveform signal from the output thereof. At the same time, the differential pulse causes the signal generator $4_2$ to stop the oscillation thereof. Thus, the driving current corresponding to the output signal from the signal generator $4_3$ flows only through the stator winding coil $L_3$, whereby rotor R continues to be rotated in the clockwise direction. When rotor R reaches the position of $7\pi/4$ (radians), a differential pulse as shown in FIG. 5(h) is derived from the differential and rectifying circuit $DR_3$, and the sinusoidal waveform signal is derived from the signal generator $4_1$, and then the driving current corresponding to the output signal from the signal generator $4_1$ flows through the stator winding coil $L_1$, whereby rotor R continues through the stator winding coil $L_1$, whereby rotor R continues to be rotated in the clockwise direction. Thus, the motor continues to be rotated in synchronism with the output signals of the Hall elements $H_1$ and $H_2$ by receiving a sequential supplement of the field current to compensate for the lack of uniform magnetic flux distribution.

The signal generator is used to compensate for the distortion of the magnetic flux distribution of the rotor and thus obtain a uniform torque distribution. That is, the signal generators are each preset to develop a waveshape corresponding to the magnetic flux distribution of the rotor. For instance, in order to compensate or cancel the distortion of the magnetic flux distribution appearing in the period between $\pi/4$ and $3\pi/4$ radians in FIG. 5(m), the signal generator $4_4$ is preset to develop the partial sinusoidal waveshape, FIG. 5(i) which is symmetrical to the magnetic flux distribution of the rotor in this period. The waveshape in FIG. 5(j) is developed from the signal generator $4_2$ shown in FIG. 3B. The generator $4_2$ is preset to develop the waveshape shwon in FIG. 5(j) in order to cancel the distortion of the magnetic flux distribution of the rotor as shown in FIG. 5(m). In other words, the signal generator $4_2$ is preselected for developing the waveshape in FIG. 5(j) in view of the distortion of the rotor-magnetic flux distribution. In the illustrated embodiment of the present invention, it is assumed that the magnetic flux distribution of the rotor has been distorted as shown in FIG. 5(m). Therefore, in order to compensate for the distortion appearing, for example, in the period between $3/4\pi$ and $5/4\pi$ radians, the signal generator $4_2$ is used, which is preset to develop a predetermined waveshape in view of the measured result of the rotor-magnetic flux distribution, and regardless of the input signal applied to the signal generator itself. It is, of course, possible to preset the signal generator 4 to develop the other waveshapes in accordance with the measured result of the rotor-magnetic flux distribution, such as the waveshapes as shown in FIG. 5(k) and 5(l). The input signal applied to the signal generator merely serves to initiate the operation of the signal generator. Thus, it should be appreciated that the output signal waveshape from the signal generator is not influenced by the input signal applied thereto.

Because of the above-mentioned supplement to the field current to the stator winding coils of the motor, it is possible to obtain an approximately uniform torque, even if the magnetic flux distribution in the motor is as shown in FIG. 5(m). Further, it should be noted that an appropriate selection of the output signals from the signal generators $4_1$, $4_2$, $4_3$, and $4_4$ permits the motor to rotate with the desired torque distribution, as shown in FIG. 5(o).

The output signals from the waveform generators $4_1$–$4_4$ are amplified by the amplifiers $A_1$–$A_4$, respectively. In order to maintain the rotational speed of the DC motor constant, the signal representing the difference between the instantaneous rotational speed and a predetermined speed must be applied to the circuit supplying the driving current to the stator windings. The amplifiers $A_1$–$A_4$ are used for this purpose. The amplifiers $A_1$–$A_4$ are actuated when and only when the output signal of the coupling amplifier 20 is applied thereto so that the output signals of the signal generators $4_1$–$4_4$ are amplified and applied to the transistors $Tr_2$–$Tr_5$ of the driving circuit, thereby supplying the driving current to the stator windings coils $L_1$–$L_4$. The above operation is effected by the switching transistor in the coupling amplifier 20, but when the amplifying transistor is used, the gains of the amplifiers $A_1$–$A_4$ are controlled in response to the output signal of the coupling amplifier 20 to control the driving current to be supplied to the stator windings, thereby rotating the DC motor at a predetermined constant speed.

Figure 7A:
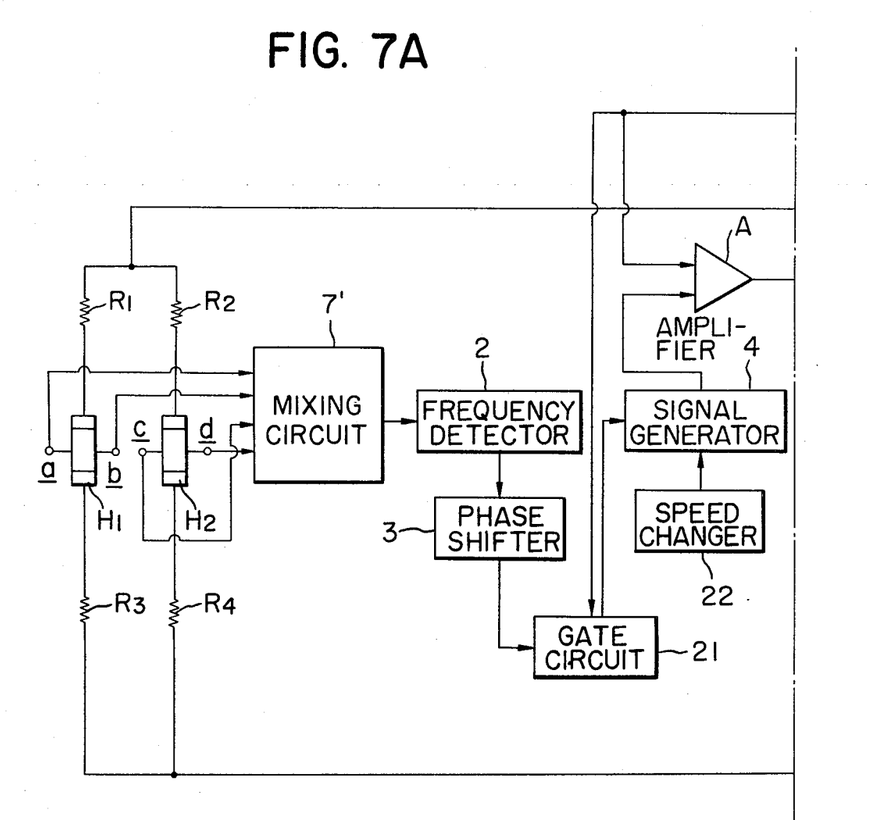
FIG. 7A and 7B are a circuit diagram of a second embodiment of the present invention.
Figure 7B:
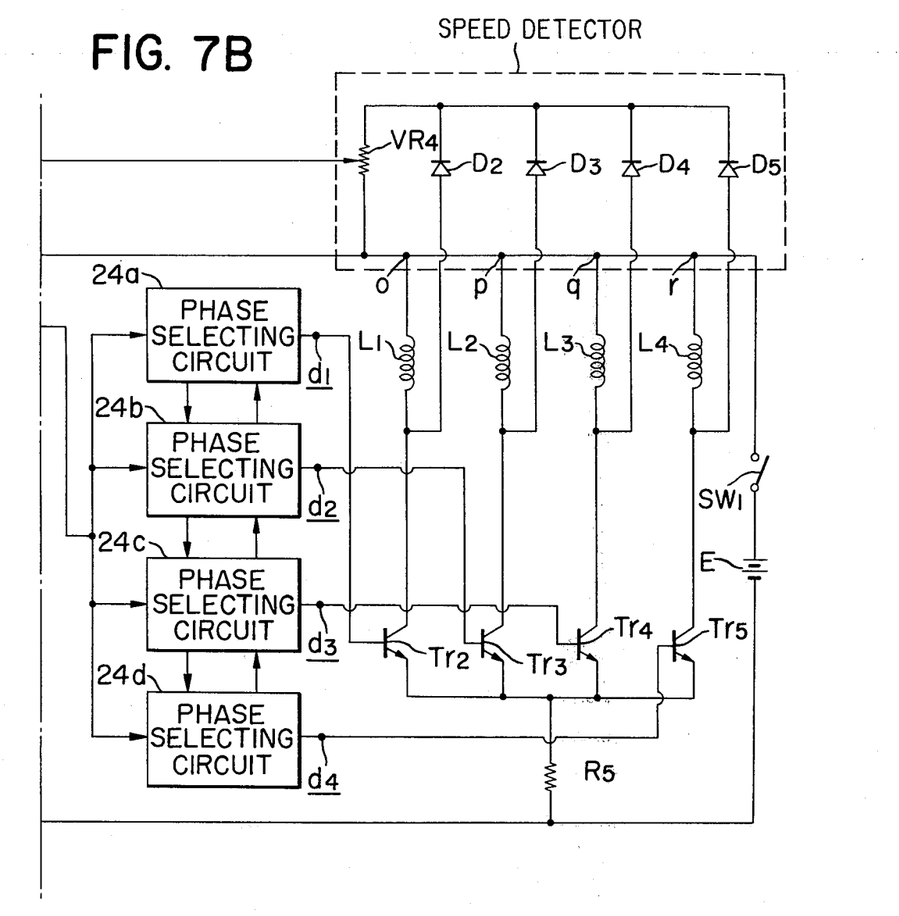

Second Embodiment, FIG. 7

Next referring to FIG. 7 the second embodiment of the present invention will be described hereinafter. The output terminal a,b,c, and d of the Hall generators are coupled to the signal generator 4 through a mixing circuit 7', the frequency detector 2, the phase shifter 3 and a gate circuit 21 of the conventional type. The output terminal of the signal generator is connected to one input terminal of the amplifier A whose output terminals are connected to a plurality of phase selecting circuits 24a–24d (the number of which is equal to the number of stator windings) which are interconnected to each other to form a feedback circuit so that no more than two circuits are actuated simultaneously. The output terminals of the phase selecting circuits 24a–24d are connected to the transistors $Tr_2$–$Tr_5$ of the driving circuit which in turn are coupled to the stator windings $L_1$–$L_4$. Diodes $D_2$–$D_5$ are connected in parallel with the stator windings $L_1$–$L_4$, respectively, to detect the voltage induced across them when they are not supplied with the driving current, and are connected to a variable resistor $VR_4$ which are also coupled to the stator windings $L_1$–$L_4$. The armature of the variable resistor $VR_4$ is connected to the other input terminal of the amplifier A and to the gate circuit 21.

Next the mode of operation of the second embodiment will be described hereinafter. The output Hall voltages of the Hall generators $H_1$ and $H_2$ are mixed by the mixing circuit 7′ and the frequency of the synthesized signal is detected by the frequency detector 2 so that the trigger pulses are generated and applied to the waveform generator 4 through the phase shifter 3 and the gate circuit 21.

Figure 8:
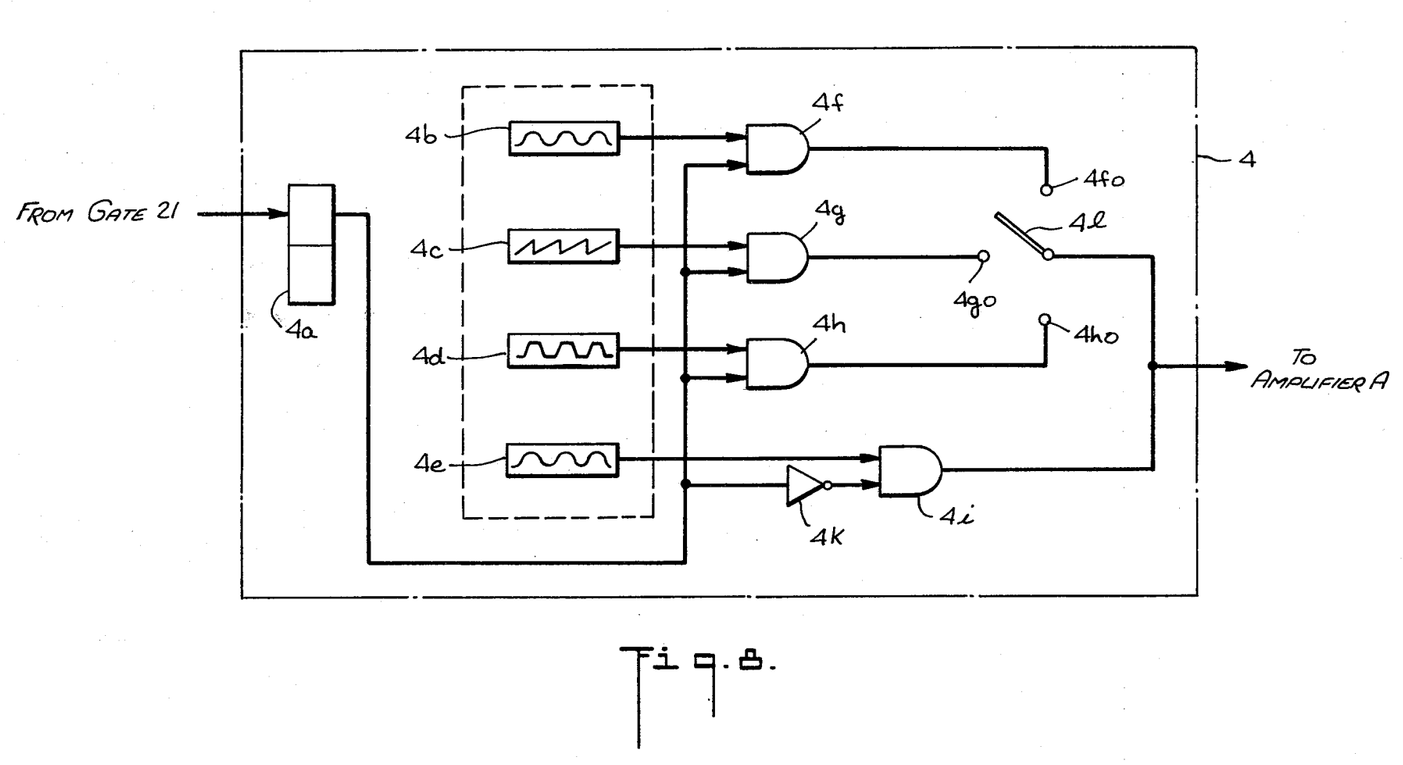
FIG. 8 is an illustrative embodiment of signal generator 4.

Any suitable, conventional circuit may be employed for the signal generator 4, such as Model 202 as manufactured by Exact Electronics, Inc., for example. FIG. 8 shows an illustrative embodiment of the signal generator 4, wherein the signal generator 4 comprises a flip-flop circuit 4a, waveform signal generating circuits 4b, 4c and 4d, a fixed frequency signal generating circuit 4e, AND circuits 4f, 4g, 4h and 4i, NOT circit 4k and a changeover switch 4l. When a trigger pulse is applied through gate 21 to the flip-flop 4a, AND gates 4f – 4h are enabled so that the signal generator 4 puts out a signal which is generated from a waveform signal generator selected by the changeover switch 4l. When the motor speed reaches a predetermined value and the trigger pulse is not applied to the flip-flop 4a, the flip-flop 4a is reset so that the AND gates 4f –4h are disenabled, whereby the output signals of the waveform signal generating circuits 4b – 4d cease to derive signals from the signal generator 4. However, since one input terminal of AND gate 4i is connected to NOT gate 4k, AND gate 4i is enabled at this time so that an output signal of the signal generating circuit 4i, that is, a fixed frequency signal, is derived from the signal generator 4.

The output signal of the wave shaping circuit 4 is applied to the amplifier A so that the amplified signal is applied to the phase selecting circuits 24a–24d, which divides the output signal of the amplifier A into four phases the number of which is equal to that of the stator windings $L_1$–$L_4$. That is, the output signal of the amplifier A is supplied at the terminal $d_1$ during for example an interval between 0 and $\pi/2$ radians, at the terminal $d_2$ during an interval between $\pi/2$ and $\pi$, at the terminal $d_3$ during an interval between $\pi$ and $3/2\pi$ and at the terminal $d_4$ during an interval between $3/2\pi$ and $2\pi$, so that the transistors $Tr_2$–$Tr_5$ are sequentially conducted during the above intervals to supply the driving current to the stator windings $L_1$–$L_4$.

When the driving current is not supplied to the stator windings $L_1$–$L_4$, the voltages are induced across them so that the collector potentials of the transistors $Tr_2$–$Tr_5$ become higher than the potential at the junctions $o,p,q$, and $r$ of the stator windings $L_1$–$L_4$ so that the current passes through the diodes $D_2$–$D_5$. When the voltage across the variable resistor $VR_4$ becomes higher than a predetermined level, the gate circuit 21 is closed so that the Hall generators $H_1$ and $H_2$ are disconnected from the DC motor. As a result the output signal with an arbitary waveform is derived from the signal generator 4 dependent upon the voltage of the power source E and is used as a reference signal based upon which is rotated the DC motor as in the case of the first embodiment. In this case the output signal of the speed detector comprising the diodes $D_2$–$D_5$ and the variable resistor $VR_4$ is applied to the amplifier A so that the DC motor may be rotated in synchronism with the reference signal. The reference signal generator 10 and the comparator 9 of the first embodiment may be incorporated into the second embodiment.

In the second embodiment, the signal generator 4 functions also as a reference signal generator, and is adapted to vary the frequency of its output signal, whereby the rotational speed of the DC motor may be variable.

When the rotational speed of the DC motor is dropped due to a heavy load or is deviated from a predetermined rotational speed, the voltage across the variable resistor $VR_4$ drops so that the gate circuit 21 is opened. As a result the output signals of the Hall generators are applied to the signal generator 4 again so that the speed regulation is automatically resumed. Therefore there may be provided the DC motor whose rotational speed may be immediately returned to a predetermined synchronized speed under the external disturbance.

Opposed to the conventional system in which the driving currents are switched directly in response to the output signals of the Hall generators, according to the present invention the output signals of the Hall generators are shifted by the phase shifter so that the driving currents may be supplied to the stator windings of the DC motor in response to the output signals of a desired waveform which are in synchronism with the output signals of the Hall generators. Therefore the rotation of the DC motor with a uniform torque distribution or any desired torque distribution may be obtained.

According to the present invention the frequency of the output voltages of the Hall generators are detected by a digital manner so that even when there is the product variation the rotational speed may be detected with a higher degree of accuracy. Furthermore the assembly and adjustment of the DC motors may be much facilitated.

In the conventional system in which the transistors in the driving circuit are driven by the output signals of the Hall generators, the sufficient driving current cannot be obtained because of the limit of the Hall voltages produced. According to the present invention, however, the output signals of the Hall generators are used as the trigger signals for actuating the driving circuit capable of giving the sufficiently high driving currents to the stator windings. Therefore the DC motor with a higher output may be provided.

I claim:
1. A DC motor and control system therefore comprising, in combination:
 a. A DC motor comprising
  a rotor having magnetic poles of opposite polarities thereon and a non-uniform magnetic flux distribution, and
  stator windings positioned in torque-producing relation to said rotor;
 b. Hall generators positioned in flux-sensing relation to said magnetic poles so as to detect the instantaneous rotational speed thereof and to generate electrical signals with a frequency representing the instantaneously changing rotational speed of said DC motor;

c. means connected to said Hall generators for detecting the crest or peak values of the output signals of said Hall generators so as to generate pulse signals representing said crest or peak values,
d. means for generating a signal of a waveform corresponding to the magnetic flux distribution of said rotor to retain an axis output of said DC motor constant by compensating for a magnetic flux distribution inherent to the field of said DC motor comprising:
a plurality of waveform generators each adapted to be triggered in response to the pulse signals from said pulse signal generating means to generate the signal with the desired waveform, and switching means for selectively outputting the output signals with various waveforms of said waveform generator, whereby a signal with a desired waveform for compensating for the flux distribution in the DC motor may be developed,
e. motor speed detecting means disposed independently of said Hall generators for generating electrical signals representative of said instantaneous rotational speed of said rotor,
f. amplifier means to which are applied the output signals from said waveform generating means and the output signal of said motor speed detecting means,
said amplifier means being adapted to control the amplification gain of the output signals from the waveform generating means in response to the level of the output signal from said motor speed detecting means, and
g. driving control means connected to both said amplifier means and said stator windings for applying an exciting current to said windings in response to the output of said amplifier means.

2. A DC motor and control system therefor as defined in claim 1 wherein said driving control means comprises phase selecting circuits,
said phase selecting circuits being capable of splitting in a predetermined phase interval the output signals of said amplifier means to be supplied to said stator windings, whereby said rotor may be rotated in a predetermined direction so as to provide a uniform shaft output.

3. A DC motor and control system therefor comprising, in combination:
a. a DC motor comprising
a rotor having magnetic poles of opposite polarities thereon and a non-uniform magnetic flux distribution, and
stator windings positioned in torque-producing relation to said rotor;
b. Hall generators positioned in flux-sensing relation to said magnetic poles so as to detect the instantaneous rotational speed thereof and to generate an instantaneously changing rotational speed of said DC motor;
c. pulse signal generating means connected to the output terminals of said Hall generators for detecting the frequency of the Hall voltage output and generating a pulse signal train representing the frequency,
d. means for generating a signal of a waveform corresponding to the magnetic flux distribution of said rotor in response to the pulse signal train from said pulse signal generating means, said waveform generating means including speed control means so that said waveform generating means may have a predetermined frequency used as a reference frequency based upon which said DC motor may be rotated at a constant speed when said waveform generating means is disconnected from said pulse signal generating means,
e. motor speed detecting means including means for detecting the voltages induced across the stator windings which are not supplied with the driving current,
f. Hall generators positioned in flux-sensing relation to said magnetic poles so as to detect the instantaneous rotational speed thereof and to generate electrical signals with a frequency representing the instantaneously changing rotational speed of said DC motor;
g. driving control means connected to both said amplifier means and said stator windings for applying an exciting current to said windings in response to the output of said amplifier means;
h. gate means for detecting the level of the output signal of said motor speed detecting means so as to interrupt the pulse train from said waveform generating means, said gate means interrupting said pulse train when the level of the output signal from said motor speed detecting means reaches a predetermined level which represents a predetermined level which represents a predetermined speed of said DC motor, whereby said waveform generating means functions as a reference signal generating means for generating a reference signal of a predetermined frequency.

4. A DC motor and control system therefor comprising, in combination,
a. a rotor having magnetic poles of opposite polarities thereon and a non-uniform magnetic flux distribution;
b. a stator having flux-producing windings positioned in torque-producing relation to said rotor;
c. Hall generators positioned in fixed relation to said stator and angularly spaced apart from each other and in magnetic relation to said rotor so as to sense the magnitude of the rotor flux density as a function of the angular position of said rotor and to generate electrical signals with a frequency representing the instantaneously changing rotational speed of said DC motor;
d. means for detecting the frequency of the output signals in a digital manner and generating an analog signal representing said frequency,
e. reference signal generating means disposed independently of said Hall generators for generating a reference signal corresponding to a predetermined constant speed of said DC motor;
f. analog comparator means for comparing the analog signal from said detecting means with the reference signal, to generate an output signal representing the difference therebetween,
g. pulse signal train generating means connected to said Hall generators for detecting the output signals thereof and generating a pulse signal train representing the peak values thereof,
h. means connected to said pulse signal train generating means adapted to be triggered thereby for generating a signal of a waveform corresponding to the magnetic flux distribution of said rotor in synchronism with said pulse train,
i. amplifier means to which are applied the output signal from said comparator means and the output signals of said waveform generating means, the amplification gain of said output signals from said waveform generating means being controlled in reponse to the level of said output signal from said comparator means, and j. driving control means connected to both said amplifier means and said stator windings for applying an exciting current to said windings in response to the output of said amplifier means.

5. A DC motor and control system thereof comprising, in combination:

a. a DC motor comprising a rotor having magnetic poles of opposite polarities thereon and a nonuniform magnetic flux distribution, and stator windings positioned in torque-producing relation to said rotor;

b. Hall generators positioned in flux-sensing relation to said magnetic poles so as to detect an instantaneous rotational speed thereof for generating electrical signals with a frequency representing the instantaneously changing rotational speed of said DC motor;

c. pulse generating means connected to said Hall generators for detecting a predetermined value of the output signals from said Hall generators and generating pulse signals representing said predetermined value;

d. means for generating a signal of a waveform corresponding to the magnetic flux distribution of said rotor to retain an axis output of said DC motor constant by compensating for a magnetic flux distribution inherent to the field of said DC motor in response to the pulse signals from said pulse generating means; and e. driving control means interconnected between said signal generating means and said stator winding for applying an exciting current to said stator winding in response to the output signals of said signal generating means.

* * * * *

UNITED STATES PATENT AND TRADEMARK OFFICE
CERTIFICATE OF CORRECTION

PATENT NO. : 3,999,108
DATED : December 21, 1976
INVENTOR(S) : KINJI TANIKOSHI

It is certified that error appears in the above-identified patent and that said Letters Patent are hereby corrected as shown below:

First Page, Bibliographic Data, below "[21]", insert:

-- [30]    Foreign Application Priority Data
    August 16, 1972   Japan .......... 47-82002 --.

Column 2, line 18, change "may e" to -- may be --.
Column 3, line 13, change "the" (first occurrence) to -- The --.
Column 4, line 1, change "biase" to -- bias --; line 24, change "terminals" to -- terminal --; line 43, change "biase" to -- bias --; line 59, after "coupled" insert -- to --.
Column 5, line 18, change "thz" to -- the --.
Column 6, line 50, after "E", delete "$\pi/4$".
Column 7, line 67, change "shwon" to -- shown --.
Column 9, line 26, change "circit" to -- circuit --.
Column 12, lines 26 and 27, delete "a predetermined level which represents".

Signed and Sealed this fifth Day of July 1977

[SEAL]

Attest:

RUTH C. MASON
Attesting Officer

C. MARSHALL DANN
Commissioner of Patents and Trademarks